E. H. Smith.
Harvester Rake.
No. 87,211. Patented Feb. 23, 1869.
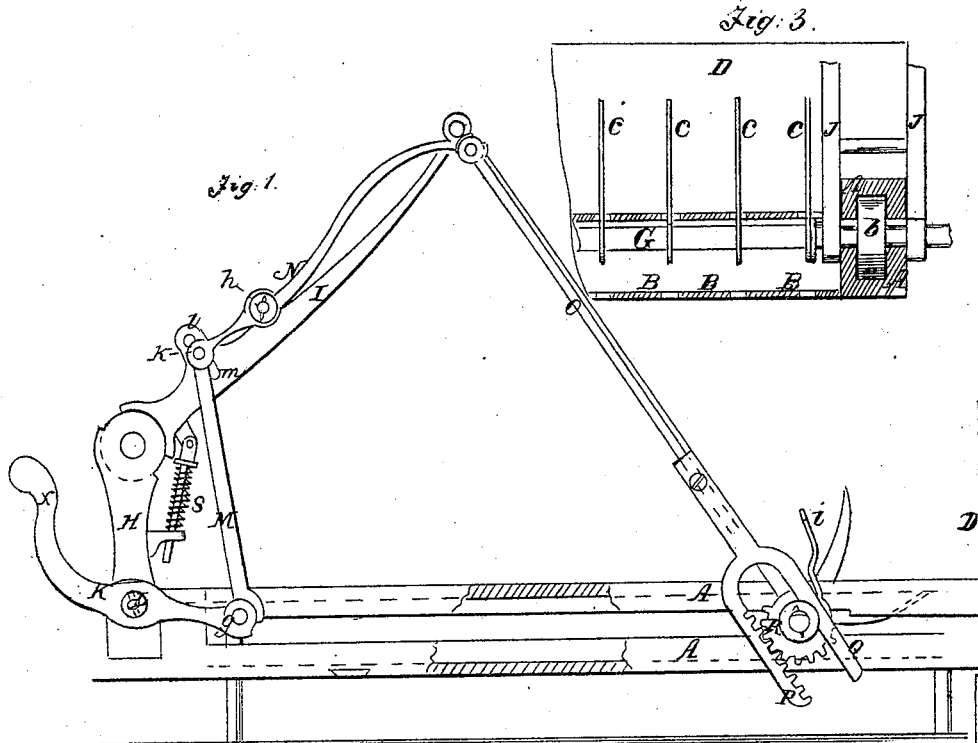
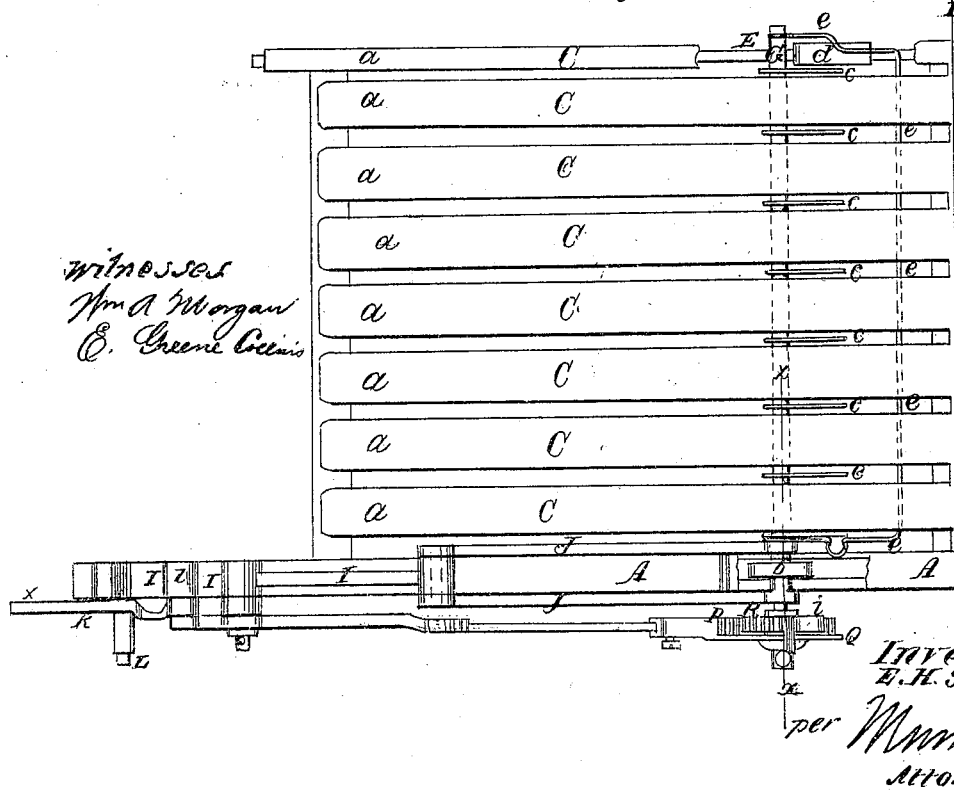
Witnesses
Wm A Morgan
E. Greene Collins
Inventor:
E. H. Smith
per Munn & Co
Attorneys.

UNITED STATES PATENT OFFICE.

EDWIN H. SMITH, OF WESTMINSTER, MARYLAND.

IMPROVEMENT IN HARVESTER-RAKES.

Specification forming part of Letters Patent No. 87,211, dated February 23, 1869.

*To all whom it may concern:*

Be it known that I, EDWIN H. SMITH, of Westminster, in the county of Carroll and State of Maryland, have invented a new and Improved Self-Rake for Reaping-Machines; and I do hereby declare that the following is a full, clear, and exact description thereof, which will enable others skilled in the art to make and use the same, reference being had to the accompanying drawings, forming part of this specification, in which—

Figure 1 is a side view of my invention. Fig. 2 is a plan view of the same. Fig. 3 is a dovetail section through $x$ $x$, Fig. 2.

Similar letters of reference indicate like parts.

The object of this invention is to provide a simple and effective self-rake attachment for reaping-machines, which, deriving its motion from the main drive-wheel of the reaper, will obviate the necessity of employing an extra hand to rake off the grain as it falls on the reaper-platform.

My invention operates easily and effectively, and contains few, if any, objectionable features of importance.

It consists, in general terms, of a rake-head arranged at a right angle with the cutter-bar, and passing to and fro under a system of parallel slats, arranged across the platform and parallel to the cutter-bar.

The rake-head is made to partially revolve at each end of its travel, to throw the rake-teeth, which it bears, up and down, so that the said teeth will be below the slats on which the grain falls from the cutter when the rake is moving across the platform to the side opposite the raking-off side, and on its arrival at which point the teeth rise up between the slats and assume a vertical position and pass between them back toward the raking-off side.

It further consists of the accessory mechanism for working the rake in the manner described, as is hereinafter set forth.

In the drawings, A A are two grooved guide-bars, forming the rear part of the frame of the platform, and affording attachment for the fixed bottom boards B B B, &c., of the platform. Above these boards B are slats C C C, &c., of any suitable number. These are each affixed to the frame of the platform at one of their ends only, the ends $a$ on the raking-off side being free, so that the rake can emerge from under them and deliver the grain entirely off from the platform, and thereby prevent its lodgment in the track of the team on the next round or swath. D is the side-board or separator.

The cutter-bar is not shown in the drawings, it forming no part of the present invention; but its place is just in front of the forward guide-bar, E, and parallel with the same. This guide-bar is shown by breaking away the front slat.

The rear guide-bars, A A, are arrranged with their grooves opposite each other, and a collar, $b$, on the rake-head G rests partially in each groove, and travels in them as the rake moves to and fro.

$c$ $c$ $c$, &c., are rake-teeth, arranged in the spaces between the slats C.

The forward end of the rake-head does not rest directly on the guide-bar E, but its weight is borne by a sliding shoe, $d$, affixed to the bent rod $e$, which latter embraces loosely, in the manner of a bearing, each end of the rake-head, and incloses the teeth of the same, and acts as a stop to limit the reach of the rake by encountering the frame of the platform.

From the description thus far, it will be seen that the rake-head passes to and fro across the platform, beneath the slats C, and above the boards B, and having its teeth $c$ arranged to rise up between the slats C, and being guided by means of a collar, $b$, traveling in the grooved guides A A.

Now, in order to cause the rake to operate effectively, the teeth $c$ must rise up to a vertical position between the slats at the commencement of the raking-off stroke and at the completion of it. As the grain is delivered from the platform, the said teeth must vibrate to a horizontal position, so as to present no obstacle to encounter the grain on the slats (which fell from the cutter-bar after the passing of the rake) in the forward reach of the rake for another rakeful.

The mechanism for thus operating the rake will now be described.

H is a standard, rising from the platform or gear-frame of the reaper. At its upper end is hinged an arm, I, to the upper end of which latter are hinged two rods, J J. The lower ends of these latter embrace the rake-head loosely, allowing it to turn freely within the eyes or holes by which the said rods are attached to the rake-head. These rods embrace the rake-head on either side of the guide-bars A A, as shown.

K is a lever, pivoted on the stud L, projecting from the standard H, or other suitable point. The end $f$ of this lever is to be connected with a pitman, or other suitable device, for obtaining a vibrating motion of the lever K from the main drive-wheel of the reaper, or some portion of its accessory gearing. The end $g$ of the said lever is pivoted to a rod, M, the upper end of which latter is pivoted to another lever, N, vibrating on a stud, $h$, projecting from the arm I. To the upper end of the lever N is pivoted a rod, O, which extends down to the rake-head, and terminates in two branches, P and Q, the under one of which, P, is formed with cog-teeth on its inner face, thus forming a rack, which engages a toothed segment, R, keyed on the rake-head. The branch Q rests on a circular boss, forming part of the toothed segment R, and serves to hold the rack engaged with the teeth of the said segment R.

Now, supposing the rake-head to be at the extent of its reach, the downward movement of the end $f$ of the lever K will cause the rack P to descend and throw up the teeth $c$. Fig. 1 shows the teeth in the act of being thus thrown up.

$i$ is a stop affixed to the segment R, and its end encounters the rod O when the teeth are brought to the proper vertical position for gathering the grain and raking off. The downward movement of the end $f$ of the lever K continuing, the rake is drawn across the platform and the grain delivered off the platform. The motion of lever K being now reversed, the rack P, acting on the segment R, turns the rake-teeth downward below the slats C, and, the said motion of the lever continuing, the rake-head is reached back to its first position for another rakeful. This to-and-fro motion of the rake-head is obtained from the lever K by means of the pivot-stud $k$, which projects into a slot, $m$, formed in the swelled part $l$ of the arm I. This slot and pivot-stud act as a stop to limit the vibration of the lever N in either direction, so that the movement of the lever K will be transmitted to the arm I, and, through it and its connecting-rods J J, to the rake-head.

S is a coiled spring, interposed as shown, to assist in the raking-off motion.

Having thus described my invention, I claim as new and desire to secure by Letters Patent—

1. The combination, in a self-rake for reaping-machines, of the slats C, free at their delivery ends and fixed at the others, with the partially-rotating rake G $c\ c\ c$, &c., and any side-delivery platform, substantially as shown and described.

2. The combination, in a self-rake, of the levers K and N, rods M and O, standard H, arm I, and rods J J, all operating substantially as shown and described.

3. The method of oscillating the rake-head G by means of the rod O, bearing a straight branch, Q, and rack-branch P, and toothed segment R on the rake-head, all substantially as set forth.

4. The combination, in a self-rake, of the sliding shoe $d$, stop-rod $e$, and guide-bar E with the vibrating rake G $c\ c\ c$, &c., and grooved guide-bars A A, all substantially as set forth.

EDWIN H. SMITH.

Witnesses:
NATHANIEL SHIPLEY,
JOSHUA W. SELLMAN.